United States Patent [19]

Iida et al.

[11] Patent Number: 4,728,503

[45] Date of Patent: Mar. 1, 1988

[54] FILTER MEDIUM FOR TREATING AN EXHAUST GAS

[75] Inventors: Yukio Iida; Mitsuhiro Horaguchi; Yuji Kaihara; Shigechika Tomisawa, all of Yokohama, Japan

[73] Assignee: Mitsubishi Jukogyo Kabushiki Kaisha, Tokyo, Japan

[21] Appl. No.: 854,936

[22] Filed: Apr. 23, 1986

[51] Int. Cl.$^4$ .............................................. B01D 50/00
[52] U.S. Cl. ..................... 422/169; 422/176; 422/177; 55/316; 55/380; 55/382; 55/486; 55/524; 55/DIG. 30
[58] Field of Search ............... 422/176, 177, 312, 169; 55/316, 380, 382, 486, 523, 524, DIG. 30; 60/301, 311; 502/350

[56] References Cited

U.S. PATENT DOCUMENTS

| | | | |
|---|---|---|---|
| 3,227,659 | 1/1966 | Bradenburg et al. | 422/177 |
| 3,526,322 | 9/1970 | Burroughs et al. | 55/389 |
| 3,596,441 | 8/1971 | Lundahl | 55/380 |
| 3,627,497 | 12/1971 | Klein et al. | 55/380 |
| 3,826,066 | 7/1974 | Higgins | 55/380 |
| 3,853,510 | 12/1974 | Meyer et al. | 55/380 |
| 4,259,096 | 3/1981 | Nakamura et al. | 55/316 |
| 4,426,320 | 1/1984 | Ernest et al. | 55/DIG. 30 |
| 4,472,587 | 9/1984 | Benedetti et al. | 502/350 |

FOREIGN PATENT DOCUMENTS

| | | | |
|---|---|---|---|
| 222212 | 12/1984 | Japan | 422/177 |
| 2078132 | 1/1982 | United Kingdom | 55/DIG. 30 |

Primary Examiner—David L. Lacey
Attorney, Agent, or Firm—Holman & Stern

[57] ABSTRACT

A filter medium for treating exhaust gases is described. The filter medium comprises a porous ceramic substrate, a pre-coat layer of a reaction aid and a layer of a solid material formed on one side of the substrate from which the exhaust gas is charged through the substrate, and a catalyst layer for eliminating nitrogen oxides formed on the other side of the substrate from which the exhaust gas is discharged. The filter medium may have a double-cylinder construction, in which the catalyst layer is formed on at least one side of a inner cylinder and the pre-coat layer and the solid material layer are formed on an outer side of an outer cylinder.

8 Claims, 6 Drawing Figures

FILTER MEDIUM FOR TREATING AN EXHAUST GAS

BACKGROUND OF THE INVENTION

Field of the Invention and Related Application

This invention relates to the treatment of exhaust gases and more particularly, to a filter medium for effectively treating gases which are discharged in large amounts for municipal refuse incineration plants and which contain fly ashes from incinerators, hydrogen chloride, nitrogen oxides, sulfur oxides and the like.

The present inventors have already developed and proposed a technique for forming a solid layer of slaked lime and clacium chloride on a woven filter fabric in order to efficiently eliminate hydrogen chloride from exhaust gases. The filter fabric used in this technique is made of a glass wool material which has a relatively poor heat resistance. Accordingly, it is necessary that a gas passed through the fabric be kept at a temperature lower than 250° C.

Known heat-resistant filter materials include woven filter fabrics of carbon fibers and stainless steel wires. However, these fabrics have the disadvantage in that the carbon fiber-woven filter fabric is not resistant to abrasion and the stainless steel woven filter fabric is very expensive.

Although the present invention contemplates to eliminate not only hydrogen chloride, but also nitrogen oxides (i.e. denitration), it is difficult to deposit a catalyst for denitration on the stainless steel woven filter fabric in order to impart the denitration function. More particularly, for the coating of the denitration catalyst on the fabric surface, it is necesasry that the coating material (denitration catalyst) and the fabric surface be wetted sufficiently, but the stainless steel filter fabric has poor wettability, so that it is difficult to form a uniform coating layer on the fabric.

OBJECT AND SUMMARY OF THE INVENTION

It is accordingly an object of the invention to provide an exhaust gas treating filter medium or material which overcomes the above prior art problems by improving the heat resistance of a filter material at low costs and which has the function of eliminating both hydrogen chloride and nitrogen oxides.

In order to solve the problems involved in the prior art, the present inventors made intensive studies. As a result, it was found when porous ceramics were used as a filter material, the heat resistance was improved with good affinity for catalysts. In addition, the ceramics had the capability of dust collection and could be cleansed by application of back-flow washing air. Thus, a favorable exhaust gas-treating medium could be obtained using the ceramic filter. The present invention is accomplished based on the above finding.

According to one embodiment of the present invention, there is provided a filter medium for treating an exhaust gas which is characterized by comprising a porous ceramic substrate, a reaction aid pre-coat layer and a solid layer which comprises slaked lime or calcium carbonate and calcium chloride and is formed on a gas-inlet side of the ceramic substrate from which an exhaust gas is charged, and a layer of a catalyst for eliminating nitrogen oxides which is formed on the other side or outlet side of the ceramic filter medium from which the exhaust gas is discharged.

According to another embodiment of the invention, there is also provided a filter medium for treating an exhaust gas which is characterized by comprising a porous ceramic double-cylinder body having inner and outer hollow cylinders each closed at one end, a catalyst layer for eliminating nitrogen oxides which is formed on at least one surface of the inner cylinder and a pre-coat layer of a specific type of reaction aid and a layer of a mixture of slaked lime or calcium carbonate and calcium chloride which are formed, in this order, on at least one surface of the outer cylinder.

DETAILED DESCRIPTION OF PREFERRED EMBODIMENTS

The first embodiment of the invention is described with reference to the accompanying drawings and particularly, to FIGS. 1 through 3.

Figure 1:
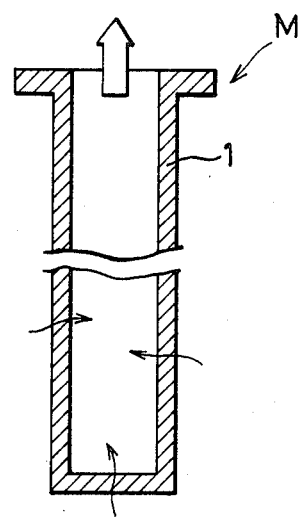
FIG. 1 is a schematic sectional view of an exhaust gas-treating medium according to one embodiment of the invention.
Figure 2:
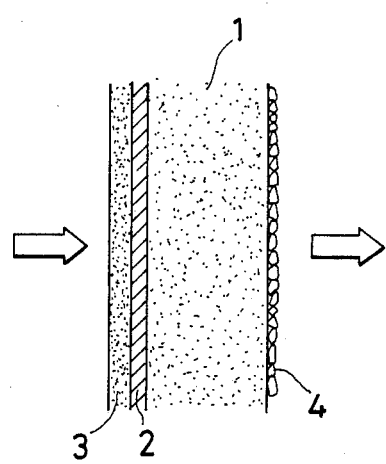
FIG. 2 is a schematic enlarged view of a part of the medium of FIG. 1.

As is particularly shown in FIGS. 1 and 2, a filter medium M of the present invention has a cylindrical construction of a porous ceramic such as, for example, mullite or highly pure alumina. The medium M has a substrate 1 and a layer 4 of a denitration catalyst, such as, for example, a mixture of vanadium pentaoxide and titanium oxide, on one side or an outlet side from which a gas is flown out or discharged. The layer 4 is formed, for example, after a firing operation on the surface of the substrate 1. On the other or inlet side of the substrate 1 from which the gas is passed in, there is formed a pre-coat layer 2 of a specific type of reaction aid in order to prevent clogging of the filter medium. A layer 3 of a mixture of slaked lime or calcium carbonate (hereinafter referred to generically as slaked lime) and clacium chloride is formed on the pre-coat layer 2. In the figures, the arrows indicate the directions of flow of a gas.

The specific type of reaction aid used as the pre-coat layer 2 of the present invention should preferably have (1) a small bulk density, (2) good air permeability, (3) non-adherence on absorption of moisture in air, and (4) a particle size of from 1 to 100 micrometers, preferably from 10 to 50 micrometers. Examples of the aid include powders of zeolite, alumina, diatomaceous earth, pearlite, activated clay, kaolin, feldspar, quartz and the like. These powders may be used singly or in combination of two or more. Of these materials, zeolite, diatomaceous earth and pearlite are preferred.

The filter medium M of the invention shown in FIGS. 1 and 2 has a cylindrical form and is constituted, for example, by the following manner.

Figure 3:
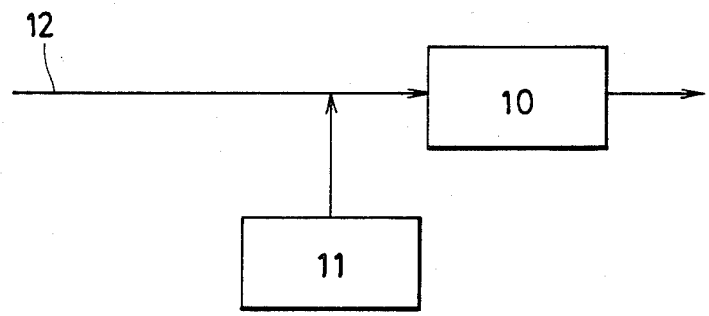
FIG. 3 is a block diagram illustrating fabrication of the medium of FIG. 1.

First, the substrate 1 on which the denitration catalyst layer 4 has been formed is placed in a duct 10 for an exhaust gas as shown in FIG. 3. Subsequently, a specific type of reaction aid as indicated above is charged from a feeder 11 of FIG. 3 to form the pre-coat layer 2 on one surface of the substrate 1 opposite to the side on which the catalyst layer 4 is formed.

When slaked lime is blown into the exhaust gas, it reacts with hydrogen chloride in the exhaust gas and is converted into calcium chloride. Accordingly, when the exhaust gas into which slaked lime is incorporated is introduced from line 12, calcium chloride and unreacted slaked lime reach the surface of the substrate 1 in the duct 10, thereby forming the solid material layer 3 on the pre-coat layer 2.

It will be noted that calcium chloride is deliquescent in nature and may convert into a sticky solid substance by condensation of moisture in the exhaust gas. If the sticky solid substance is formed, the medium may be clogged or the powder layer may be excessively compacted, making it difficult to keep the filter medium in a normal condition.

To avoid this, the pre-coat layer of a specific type of reaction aid is formed on the medium surface in the practice of the invention.

When the exhaust gas entraining slaked lime as described before is passed after the formation of the pre-coat layer 2, the solid substances in the gas form the layer (powder layer) 3 on the pre-coat layer 2. At the same time, as shown in FIG. 3, the reaction aid is invariably injected from the feeder 11 into the exhaust gas duct 10 so that the compactness of the powder layer 3 can be suppressed.

In this connection, however, these layers 2 and 3 grow with time, resulting in an increasing pressure loss of the medium. The powder layer 3 has to be scraped off at certain intervals of time and a fresh powder layer should be formed in the same manner as described above.

When an exhaust gas is passed through the medium of the present invention, unreacted hydrogen chloride in the exhaust gas reacts with slaked lime of the powder layer 3, thereby eliminating the hydrogen chloride in a high efficiency.

At the same time, dust in the exhaust gas is also eliminated by the filter medium and thus, dust collection can also be expected.

Moreover, if an alkaline substance is used as the reaction aid, sulfur oxide can be removed from the exhaust gas.

Since the medium of the invention has the denitration catalyst layer 4, passage of an exhaust gas in which ammonia gas is incorporated permits nitrogen oxides to be eliminated on contact with or passage through the layer 4.

Another embodiment of the invention is described.

Figure 4:
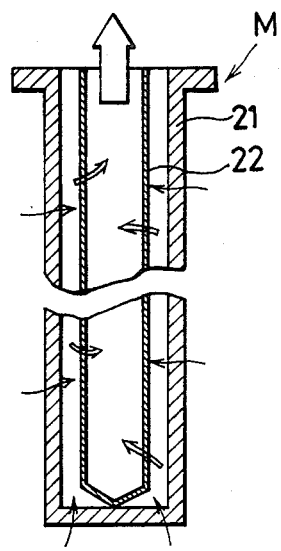
FIG. 4 is a schematic sectional view of a filter medium according to another embodiment of the invention.
Figure 5:
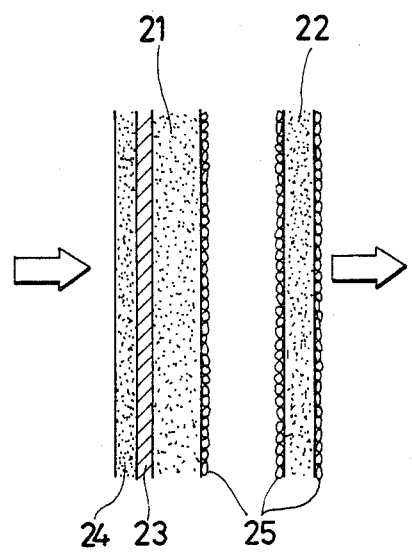
FIG. 5 is a schematic enlarged view of a part of the medium of FIG. 4.

As particularly described in FIGS. 4 and 5, a filter medium M according to another embodiment of the invention has a double-cylinder construction of a porous ceramic such as, for example, mullite, highly pure alumina or the like. The construction is composed of an outer cylinder 21 and an inner cylinder 22, which are hollow and are closed at one end as shown. The inner cylinder 22 has at least one layer 25 of a denitration catalyst such as, for example, a mixture of vanadium pentoxide and titanium oxide. The layer 25 is formed, for example, after a firing operation on the surface of the filter medium. In the figures, the denitration catalyst layers 25 are formed on both sides of the inner cylinder 22, i.e. gas inlet and outlet sides, and also on an outlet side of the outer cylinder 21. A pre-coat layer 23 of a specific type of reaction aid is provided on an inlet side of the outer cylinder 21 from which an exhaust gas is passed. On the pre-coat layer 25 is formed a layer 24 of a solid material comprising a mixture of slaked lime or calcium carbonate and calcium chloride. In these figures, the arrows indicate the directions of flow of the exhaust gas.

The filter medium M of the invention is formed as follows.

Figure 6:
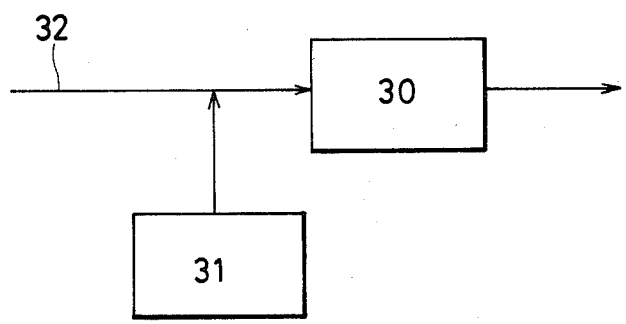
FIG. 6 is a block diagram illustrating fabrication of the medium.

The inner and outer cylinders 22, 21 which have, respectively, the denitration layers 25 as desired are placed in a duct 30 for an exhaust gas as shown in FIG. 6. Subsequently, a specific type of reaction aid as defined with regard to the first embodiment of the invention is introduced from a feeder 31 into the duct 30, thereby forming the pre-coat layer 23 on the outer side of the outer cylinder 21.

On the other hand, when slaked lime in the form of powder is brown into the exhaust gas, it reacts with hydrogen chloride in the exhaust gas to form calcium chloride. When the exhaust gas into which slaked lime has been charged is introduced from line 32, calcium chloride and unreacted slaked lime reach the surface of the outer cylinder 21 on which the solid material layer 24 is formed.

The subsequent treatment of the pre-coat layer 23 and the solid material layer or powder layer 24 is made in the same manner as in the first embodiment described before.

This type of filter medium has similar effects as the filter medium of the first embodiment. In addition, when the denitration catalyst layers 25 are formed on the gas-outlet side of the outer cylinder 21 and on opposite sides of the inner cylinder 22, nitrogen oxides can be more effectively removed on contact, with the layers 25, of the exhaust gas in which ammonia gas has been incorporated.

What is claimed is:

1. A filter medium for treating an exhaust gas comprising a porous ceramic substrate having a first and second side, positioned on said first side of said substrate a pre-coat layer of a material which prevents clogging of the porous substrate, and a layer of a mixture of slaked lime or calcium carbonate and calcium chloride formed on said pre-coat layer and a layer of denitrating catalyst for eliminating nitrogen oxides positioned on said second side of said substrate for contacting exhaust gas which flows from said first side to said second side of said substrate.

2. The filter medium according to claim 1, wherein said ceramic substrate is in the form of a hollow cylinder closed at one end thereof and the catalyst layer is formed on an inner surface of said hollow cylinder.

3. The filter medium according to claim 1, wherein said pre-coat layer is in the form of a powder of a member selected from the group consisting of zeolite, alumina, diatomaceous earth, pearlite, activated clay, kaolin, feldspar, quartz and mixtures thereof.

4. The filter medium according to claim 1, wherein said catalyst is a mixture of vanadium pentoxide and titanium oxide.

5. A filter medium comprising a double-cylinder component having inner and outer hollow cylinders closed at one end thereof, a denitrating catalyst layer for eliminating nitrogen oxides being positioned on one side of said inner hollow cylinder, a pre-coat layer of material which prevents clogging of the porous substrate, and a layer of a mixture of slaked lime or calcium carbonate and calcium chloride being positioned on one side of said outer cylinder.

6. The filter medium according to claim 5, further including a denitrating catalyst layer positioned on the other side of said inner cylinder.

7. The filter medium according to claim 6 further including a denitrating catalyst layer positioned on another side of said outer cylinder.

8. The filter medium according to claim 5, wherein said pre-coat layer is in the form of a powder of a material selected from the group consisting of zeolite, alumina, diatomaceous earth, pearlite, activated clay, feldspar, quartz and mixtures thereof.

* * * * *